April 10, 1962  R. J. COOPER  3,028,924
MOTOR VEHICLE TRANSMISSION SYSTEMS
Filed July 6, 1959
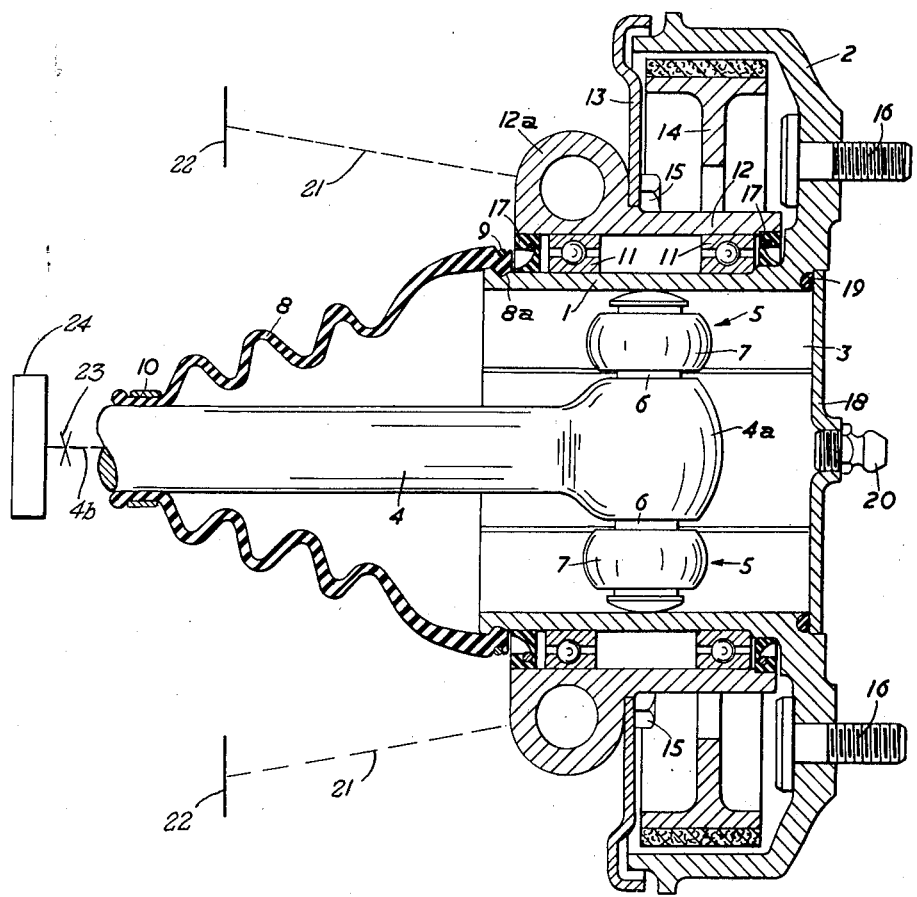
INVENTOR
RAYMOND JAMES COOPER
BY
Irwin S. Thompson
ATTORNEY

United States Patent Office 3,028,924
Patented Apr. 10, 1962

3,028,924
MOTOR VEHICLE TRANSMISSION SYSTEMS
Raymond James Cooper, Birmingham, England, assignor to Birfield Engineering Limited, London, England
Filed July 6, 1959, Ser. No. 825,164
Claims priority, application Great Britain July 8, 1958
4 Claims. (Cl. 180—73)

This invention relates to motor vehicle transmission systems and in particular to the final drives of such systems employing independent suspension for the driven wheels.

In the final drive of a motor vehicle having independent suspension of the driven wheels each driving axle half-shaft is normally coupled through two separate universal joints disposed at its ends and fixed respectively to the sprung differential gearing and an unspring wheel hub. The space occupied by the joints results in short half-shafts whose movement possesses a correspondingly high angularity with which the joints have to cope, and the weight of the joints fixed to the wheel hubs adds to the unsprung weight of the vehicle.

The object of the invention is to provide an improved final drive arrangement for a motor vehicle with independently suspended driven wheels which will, in particular, enable half-shafts of longer length to be used for a given vehicle track and the unsprung weight of the vehicle to be reduced.

According to the invention the universal joint at the outer end of a driving axle half-shaft comprises a pot joint, said pot joint being built into a wheel hub itself with a central portion of the hub structure forming the body of the joint.

The term "pot joint" as used herein is intended to indicate a universal joint having pivot means projecting transversely from one end of a shaft member and movable within a hollow pot-like body member whose inner surface is formed with longitudinally extending guide means with which the pivot means engage in such manner that the shaft member may rotate relatively to the body member in a first plane about the pivot axis of the pivot means and in a second plane normal to said first plane with a corresponding tilting of the axis of the pivot means within the body member whilst guided by the guide means, relative axial movement of the two members being accommodated by movement of said end of the shaft member axially within the body member accompanied by movement of the pivot means along the guide means with interengagement of the pivot and guide means providing a driving connection between the two members.

In the practical application of the invention the half-shaft forms the shaft member of the pot joint and the axial movement of its outer end relatively to the hub is at least in part accommodated between the outer and inner bearing planes in which the wheel bearings are situated, and the length of the half-shaft is considerably increased so that the angularity of its movement is correspondingly reduced.

Preferably the hub structure is formed integrally with a brake drum, resulting in a wheel hub and brake assembly which is simple and economical to manufacture, easy to assemble and light in weight.

The invention will now be further described with reference to the accompanying drawing which illustrates, by way of example, one embodiment of the invention in the form of a complete wheel hub, brake and axle half-shaft assembly. A hollow cylindrical central hub portion 1 providing a pot joint body member is formed integrally at its other end with a brake drum 2 and has formed in its inner surface two diametrically opposed and longitudinally extending guideways 3 which form guide means of the joint.

One portion of axle-shaft 4 projects into the hollow central hub portion 1 from the inner end thereof and is provided at its outer end 4a, which is disposed within the hub portion 1, with pivot means 5 which engage with the guideways. The inner end of shaft 4 as represented by broken line 4b is connected to a universal joint 23. The universal joint 23 is in turn connected to a differential gearing 24 or some such driving means. The pivot means 5 comprise a cross pin 6 which carries part-spherical bearing races near its ends, and these races 7 enable the pivot means 5 to execute a rolling movement along the guideways 3 to accommodate relative axial movement of the half-shaft 4 and hub 1. The guideways 3 have a part-cylindrical surface the radius of which corresponds to the spherical radius of the bearing races 7.

The inner end of the hub portion 1 is sealed by a flexible rubber boot 8 which at its outer end is clamped around the hub 1 by a wire 9 and has an inwardly directed integral moulded lip 8a which seats in an annular peripheral groove in the hub, and which at its inner end is clamped around the half-shaft 4 some distance from the hub 1 by means of a clamping ring 10.

The central hub portion 1 is mounted in two spaced antifriction bearings 11 which are disposed in bearing planes located respectively adjacent the inner and outer ends of the central hub portion 1 and in turn mounted in a wheel hub mounting structure 12 which is provided with lugs 12a for mounting the whole assembly on an associated motor vehicle by means of arms connected thereto illustrated by broken lines 21 connected to pivot points 22 located on the vehicle frame. A brake backplate 13 on which are mounted the brake operating gear and brake shoes 14 of the brake is fixed by a ring of bolts such as 15 to the wheel hub mounting structure 12 on the inner side of and adjacent to the brake drum 2. The latter is provided with a ring of outwardly extending wheel securing studs such as 16 on which the associated vehicle wheel may be mounted.

Oil seals 17 are provided between the central hub portion 1 and the wheel hub mounting 12 to retain lubricant with which the wheel bearings 11 are packed. A blanking plate 18 is bolted to and closes the outer end of the central hub portion 1, and an oil sealing ring 19 is provided to prevent escape of lubricant from the pot joint formed by the portion 1 and the outer end 4a of the half-shaft 4. A grease nipple 20, which may if desired be omitted, is fitted to the blanking plate 18 to allow additional lubricant to be supplied to the joint.

I claim:
1. In combination with a vehicle frame, a transmission member, a wheel hub structure and a rigid one piece driving axle half-shaft, said hub structure comprising a cylindrical pot-like body portion having diametrically opposed longitudinally extending guideways, independent suspension mounting means including a hub structure mounting means and suspension arms pivotally mounting said hub structure mounting means to said vehicle frame so that said hub structure moves in a vertical plane normal to the axis of said hub structure, spaced wheel bearings housed in said hub structure mounting means in which said body portion is rotatably mounted, said half-shaft having one end flexibly connected to said transmission member to be driven thereby and the other end drivingly connected to said pot-like body portion for driving said pot-like body portion, the other end of said half-shaft having a transversely extending cross-pin secured thereto, and bearing races mounted on the ends of said cross-pin in rolling engagement with said guideways for providing a driving connection for said pot-like body portion and relative axial movement of said pot-like body portion with respect to said half-shaft as said pot-like body portion moves in said vertical plane.

2. The combination according to claim 1 in which said pot-like body portion is formed integrally with a brake drum.

3. The combination according to claim 1 in which a flexible sealing boot is connected between said pot-like body portion and said half-axle to seal the inner end of said pot-like body portion.

4. A universal joint for a wheel hub structure comprising a vehicle frame to which said hub structure is mounted, independent suspension mounting means including a hub structure mounting means and suspension arms pivotally mounting said hub structure mounting means to said vehicle frame so that said hub structure is movable in a vertical plane normal to the axis of said hub structure, said hub structure having a pot-like body portion rotatably mounted in said hub structure mounting means, said pot-like body portion being hollow and having internal longitudinally extending guide means, a transmission member mounted on said frame, a rigid one piece driving axle half-shaft having one end flexibly connected to said transmission member to be driven thereby and the other end drivingly connected to said pot-like body portion to drive said pot-like body portion, a transversely extending cross-pin connected to the other end of said half-shaft, bearing members mounted on the ends of said cross-pin to engage said guide means to drive said pot-like body portion in a rotating direction and to move relative to said pot-like body portion along said guide means as said pot-like body portion moves in said vertical plane.

References Cited in the file of this patent
UNITED STATES PATENTS

| | | |
|---|---|---|
| 760,684 | Cowles | May 24, 1904 |
| 1,188,854 | Spacie | June 27, 1916 |
| 2,623,604 | Keese | Dec. 30, 1952 |
| 2,714,936 | Gregory | Aug. 9, 1955 |
| 2,871,965 | Ainsworth | Feb. 3, 1959 |